(12) United States Patent
Xu et al.

(10) Patent No.: US 7,298,460 B2
(45) Date of Patent: Nov. 20, 2007

(54) METHOD FOR DETERMINING MOTION USING A VELOCITY PREDICTOR

(75) Inventors: Yansun Xu, Mountain View, CA (US); Brian D. Todoroff, San Jose, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 11/324,424

(22) Filed: Jan. 3, 2006

(65) Prior Publication Data

US 2007/0165207 A1 Jul. 19, 2007

(51) Int. Cl.
*G01P 3/36* (2006.01)
(52) U.S. Cl. ....................................................... 356/28
(58) Field of Classification Search .................. 356/28
See application file for complete search history.

(56) References Cited

U.S. PATENT DOCUMENTS

| | | | |
|---|---|---|---|
| 3,922,093 A | 11/1975 | Dandliker et al. | |
| 4,225,240 A * | 9/1980 | Balasubramanian | ........ 356/512 |
| 4,546,347 A | 10/1985 | Kirsch | |
| 4,799,055 A | 1/1989 | Nestler et al. | |
| 5,288,993 A | 2/1994 | Bidiville et al. | |
| 5,473,344 A | 12/1995 | Bacon et al. | |
| 5,578,813 A | 11/1996 | Allen et al. | |
| 5,644,139 A | 7/1997 | Allen et al. | |
| 5,703,356 A | 12/1997 | Bidlville et al. | |
| 5,729,008 A | 3/1998 | Blalock et al. | |
| 5,729,009 A | 3/1998 | Dandliker et al. | |
| 5,786,804 A | 7/1998 | Gordon | |
| 5,825,044 A | 10/1998 | Allen et al. | |
| 5,854,482 A | 12/1998 | Bidlville et al. | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |

(Continued)

*Primary Examiner*—Thomas H. Tarcza
*Assistant Examiner*—Luke D. Ratcliffe
(74) *Attorney, Agent, or Firm*—William Nuttle

(57) ABSTRACT

A method is provided for determining motion of an optical sensor including a periodic photo-diode array relative to a surface. The method includes steps of (i) generating sets of quasi-sinusoidal signals responsive to motion along first and second directions; (ii) combining the sets of signals to generate a wrapped phase angle value for each direction at a first time; (iii) combining the sets of signals at a second time to generate a second wrapped phase angle value for each direction; (iv) computing wrapped phase angle changes for each direction between the first time and the second time; (v) computing velocity predictors for each direction using corrected average phase angle changes from a number of preceding successive frames; (vi) calculating the number of full $2\pi$ rotations needed to unwrap the phase angle changes for each direction using the velocity predictors; and (vii) computing the unwrapped or corrected phase angle changes.

17 Claims, 8 Drawing Sheets

U.S. PATENT DOCUMENTS

| | | |
|---|---|---|
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 2007/0055461 A1* | 3/2007 | Buckner .................. 702/36 |

* cited by examiner

METHOD FOR DETERMINING MOTION USING A VELOCITY PREDICTOR

TECHNICAL FIELD

The present invention relates generally to signal processing, and more particularly to a signal processing method for use with an optical navigation system to determine motion of an optical sensor relative to a surface.

BACKGROUND OF THE INVENTION

Signal processing methods are used in a wide range of applications including, for example, measuring an output from a photo-detector of an array in an optical navigation system. Optical navigation systems, such as an optical computer mouse, trackball or touch pad, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

The dominant technology used today for optical mice relies on a light source illuminating a surface, a two-dimensional (2D) array of photosensitive elements to capture the resultant images, and a signal processor that correlates successive images to detect and quantify the motion of the mouse. The image can be produced in a number of ways including illuminating the surface at or near grazing incidence to produce and image shadows due to roughness of the surface, illumination with a coherent light source to produce a speckle image of the surface, or the use of a pattern printed onto the surface itself. Regardless of the imaging method used to produce a trackable image, a processor captures the image and does a series of correlations between successive images to determine the most likely motion between frames. A similar method can be used with a linear sensor to track one dimension (1D) motion. In either case, the correlation used to track the motion of the image requires a great deal of processing and results in an unsatisfactory power consumption that limits the usefulness of the technique in power sensitive applications, such as wireless mice.

An alternative method to correlation uses an array of photosensitive elements or detectors, such as photodiodes, in which the output of the individual elements in the array are combined or wired together in a repeating pattern spanning two or more detectors to track motion along one axis or in one dimension. Generally, the detectors are wired in groups to detect motion through movement of a light-dark pattern known as speckle. Speckle is the complex interference pattern generated by scattering of coherent light off of an optically rough surface and detected by a photosensitive element, such as a photodiode, with a finite angular field-of-view or numerical aperture. The image mapped to or captured on the comb-array may be magnified or de-magnified to achieve matching and so that the distribution of spatial frequencies in the image is roughly centered around the spatial frequencies of the array. Through use of signal processing, it is possible to track the movement of this image as it moves back and forth across the comb-array and from that tracking derive the motion of the surface relative to the array.

Although a significant improvement over prior art, these speckle-based devices have not been wholly satisfactory for a number of reasons. In particular, optical navigation systems using the above comb-array have not demonstrated the accuracy demanded in state-of-the-art pointing devices today, which generally must have a path error of less than about 1%. Furthermore, the above approach involves processing signals from multiple signal processing paths, and suffers from relatively complex signal processing requirements increasing power consumption of the device or system.

Accordingly, there is a need for a signal processor or signal processing circuit and method that is capable of tracking motion from an optical sensor in one or more directions or dimensions with an acceptable path error in any direction (i.e. on-axis as well as off-axis directions). It is desirable that the circuit and method achieve this end without increasing the complexity and power consumption of the signal processor or the optical navigation system in which it is used. It is still further desirable that the method reduces the power consumption of the system, thereby making it more suitable for power sensitive applications such as wireless mice.

The present invention provides a solution to this and other problems, and offers further advantages over conventional signal processing methods.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention is directed generally to signal processing, and more particularly, to a signal processing method for use with an optical navigation system for determining motion of an optical sensor including a periodic photo-diode array relative to a surface using a velocity predictor.

Optical navigation systems can include, for example, an optical computer mouse, trackballs and the like, and are well known for inputting data into and interfacing with personal computers and workstations. For purposes of clarity, many of the details of optical navigation systems in general and optical sensors for optical navigation systems in particular that are widely known and are not relevant to the present invention have been omitted from the following description. Optical navigation systems and optical sensors are described, for example, in co-pending, commonly assigned U.S. patent application Ser. No. 11/129,967, entitled, "Optical Positioning Device Having Shaped Illumination," filed on May 16, 2005 by Clinton B. Carlisle et al., and incorporated herein by reference in its entirety.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Introduction to Speckle-Based Optical Sensors

Operating principles of speckle-based optical sensors will now be described with reference to FIGS. 1 and 2.

Figure 1:
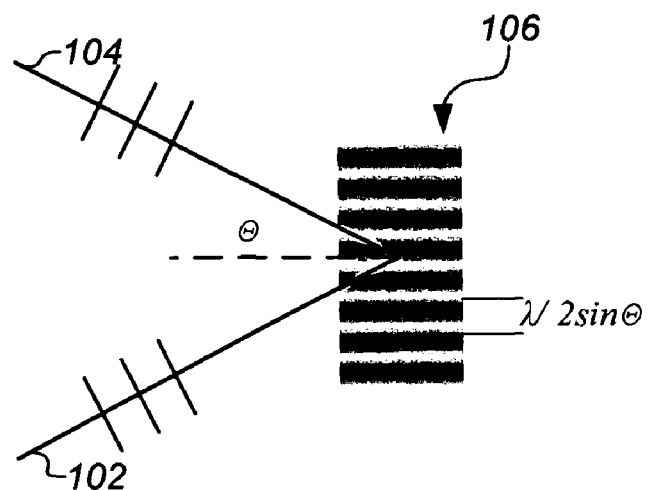
FIG. 1 illustrates a diffraction pattern of light reflected from a surface.

Referring to FIG. 1, laser light of a wavelength indicated is depicted as a first incident wave 102 and a second incident wave 104 to a surface, each making an angle of incidence θ with respect to the surface normal. A diffraction pattern 106 results which has a periodicity of λ/2 sin θ.

Figure 2:
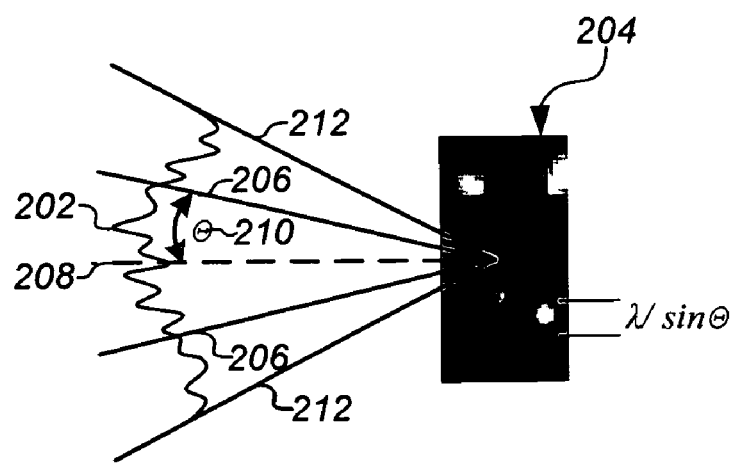
FIG. 2 illustrates a speckle in an interference pattern of light reflected from a rough surface.

In contrast, referring to FIG. 2, any general surface with morphological irregularities of dimensions greater than the wavelength of the incident light (i.e. roughly >1 μm) will tend to scatter light 202 into a complete hemisphere in approximately a Lambertian fashion. If a coherent light source, such as a laser is used, the spatially coherent, scattered light will create a complex interference pattern 204 upon detection by a square-law detector with finite aperture. This complex interference pattern 204 of light and dark areas is termed speckle. Preferably, as shown in FIG. 2, the main contribution for the measured speckle pattern 204 comes from rays 206 between the surface normal 208 and angle θ 210, not from the extreme rays 212. Speckle is essentially the random interference pattern generated by scattering of coherent light off of a rough surface and detected by an intensity photosensitive element, such as a photodiode, with a finite angular field-of-view or numerical aperture (NA). The exact nature and contrast of the speckle pattern depends on the surface roughness, the wavelength of light and its degree of spatial-coherence, and the light-gathering or imaging optics of the sensor. Although often highly complex, a speckle pattern is distinctly characteristic of a section of any rough surface that is imaged by the optics and, as such, can be employed to identify a location on the surface as it is displaced transversely to the laser and optics-sensor assembly.

Speckle is expected to come in all sizes up to the spatial frequency set by the effective aperture of the optics, conventionally defined in term of its numerical aperture NA=sin θ as shown FIG. 2. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter is defined as:

$$a = \frac{\lambda}{\sin\theta} = \frac{\lambda}{NA} \qquad (1.0)$$

where λ is the wavelength of the coherent light, NA is the numerical aperture of the photosensitive element, and θ is the angle of incidence.

It is interesting to note that the spatial frequency spectral density of the speckle intensity, which by Wiener-Khintchine theorem, is simply the Fourier transform of the intensity auto-correlation. The finest possible speckle, $a_{min}=\lambda/2NA$, is set by the unlikely case where the main contribution comes from the extreme rays 212 of FIG. 2 (i.e. rays at±θ), and contributions from most "interior" rays interfere destructively. The cut-off spatial frequency is therefore $f_{co}=1/(\lambda/2NA)$ or $2NA/\lambda$.

Note that the numerical aperture may be different for spatial frequencies in the image along one dimension (say "x") than along the orthogonal dimension ("y"). This could be caused, for instance, by an optical aperture which is longer in one dimension than another (for example, an ellipse instead of a circle), or by anamorphic lenses. In these cases the speckle pattern 204 will also be anisotropic, and the average speckle size will be different in the two dimensions.

One advantage of a laser speckle-based optical sensor is that it can operate with illumination light that arrives at near-normal incidence angles. Sensors that employ imaging optics and incoherent light arriving at grazing incident angles to a rough surface also can be employed for transverse displacement sensing. But, since the grazing incidence angle of the illumination is desired to create appropriately large bright-dark shadows of the surface terrain in the image, the system is inherently optically inefficient, as a significant fraction of the light is reflected off in a specular manner away from the sensor and thus contributes nothing to the image formed. In contrast, a speckle-based sensor can make efficient use of a larger fraction of the illumination light from the laser source, thereby enabling the development of an optically efficient displacement sensor.

Optical Navigation Systems

Figure 3:
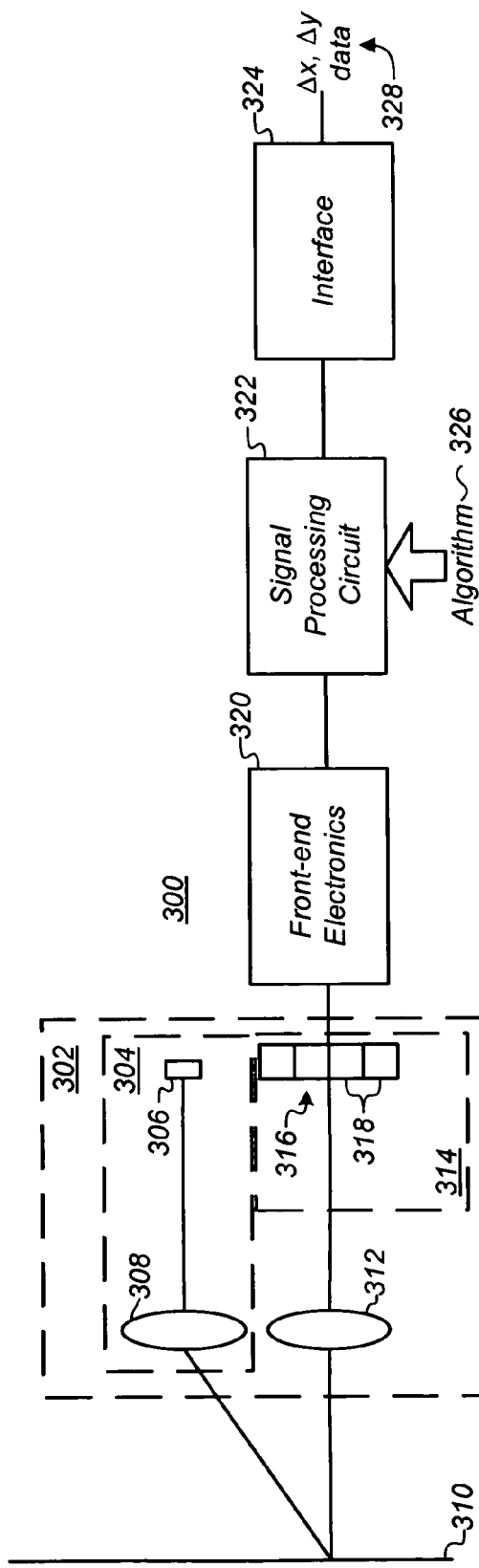
FIG. 3 is a functional block diagram of a speckle-based optical navigation system according to an embodiment of the present invention.

A functional block diagram of one embodiment of an optical navigation system for which the optical sensor and signal processing method of the present invention is particularly useful is shown in FIG. 3. Referring to FIG. 3, an optical navigation system 300 generally includes an optical head 302 having an illuminator 304 with a light source 306 and illumination optics 308 to illuminate a portion of a surface 310, imaging optics 312 to map or image a pattern of the by the surface, and an optical sensor 314 to sense or detect change in the pattern. The optical sensor 314 includes one or more one-dimensional (1D) or two-dimensional (2D) arrays 316 each having a number of photosensitive elements, such as photodiodes 318, on which light reflected from the surface 310 is received. The array(s) 316 may be configured to provide displacement measurements along two orthogonal axes, x and y. The optical navigation system 300 further includes front-end electrics 320, signal processing circuitry 322, and interface circuitry 324. Groups of photodiodes 318 in the array(s) 316 may be combined using passive electronic components in the front-end electrics 320 to produce group signals. These group signals may subsequently algebraically combined by the signal processing circuitry 322 using an algorithm 326 to produce to produce a signal providing information on the magnitude and direction of displacement of the sensor 314 in x and y directions. The signal may be converted by the interface circuitry 324 to produce Δx, Δy data 328 which may be output by the system 300.

Generally, the signal processing method of the present invention is applicable to both speckle and non-speckle based optical sensors having either multiple 1D arrays or 2D arrays. The 2D array may be either a periodic, 2D comb-array, which includes a number of regularly spaced photosensitive elements having 1D or 2D periodicity, a quasi-periodic 2D array (such as one having Penrose tiling), or a non-periodic 2D array, which has a regular pattern but doesn't include periodicities.

Figure 4:
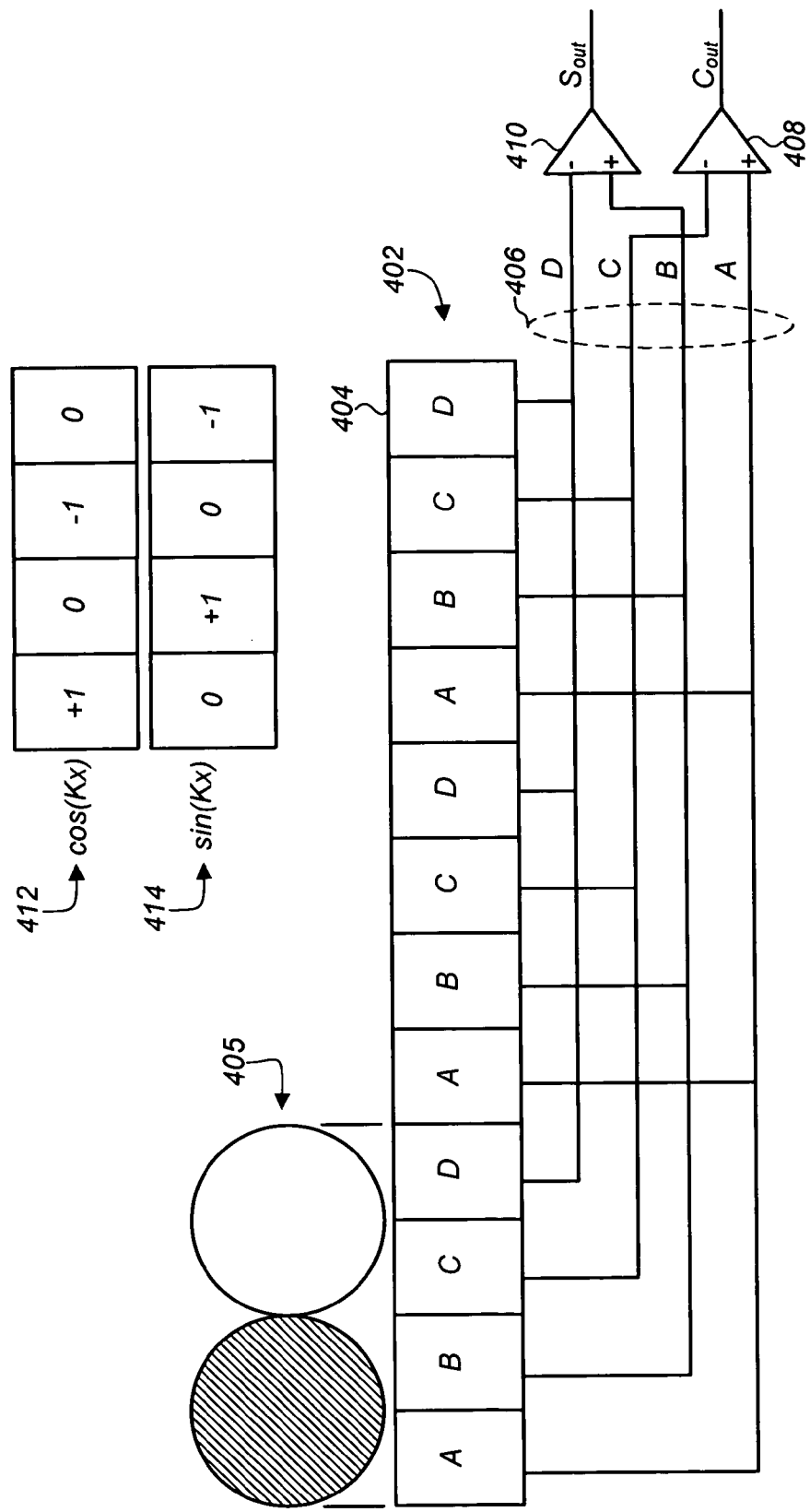
FIG. 4 is a schematic block diagram of a speckle based linear or one-dimensional (1D) comb-array having a four (4) photosensitive elements per period configuration, and for which a signal processing method according to the present invention is useful.

A linear or 1D comb-array is an array having multiple photosensitive elements that are connected in a periodic manner, so the array acts as a fixed template that interrogates one spatial frequency component of the signal. An embodiment of one such 1D comb-array is shown in FIG. 4. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 402 of photosensitive elements, such as photodiodes 404, wherein the combination of interlaced groups of photosensitive elements serves as a periodic filter on spatial frequencies of light-dark signals 405 produced by the speckle (or non-speckle) images. In the embodiment shown, the 1D comb-array 402 in consists of a number of photodiode sets or periods, each having four of photodiodes 404, labeled here as A, B, C, and D. Currents or signals from corresponding or similarly labeled photodiodes 404 in each period are electrically connected (wired sum) to form four line signals 406 coming out from the array 402. Background suppression and signal accentuation is accomplished by using differential analog circuitry 408 to generate an in-phase differential current signal, labeled here as $C_{out}$, and differential analog circuitry 410 to generate a quadrature differential current signal, labeled here as $S_{out}$. Comparing the phase of the in-phase and quadrature signals permits determination of the magnitude and direction of motion of the 1D comb-array 402 relative to a scattering surface.

Referring to FIG. 4, the in-phase $C_{out}$ and the quadrature $S_{out}$ signals are obtained by taking the underlying speckle pattern and processing them according to the cosine and sine templates, 412 and 414 respectively. Preferably, the system is designed so that an optical "light-dark" signal pattern, i.e., speckle, has a size substantially equal to the period of the comb-array—four (4) photodiodes 404 or pixels in the embodiment of FIG. 4. The in-phase signal current is obtained from $C_{out}$=A–C, and the quadrature signal current from $S_{out}$=B–D as shown in FIG. 4.

Figure 5:
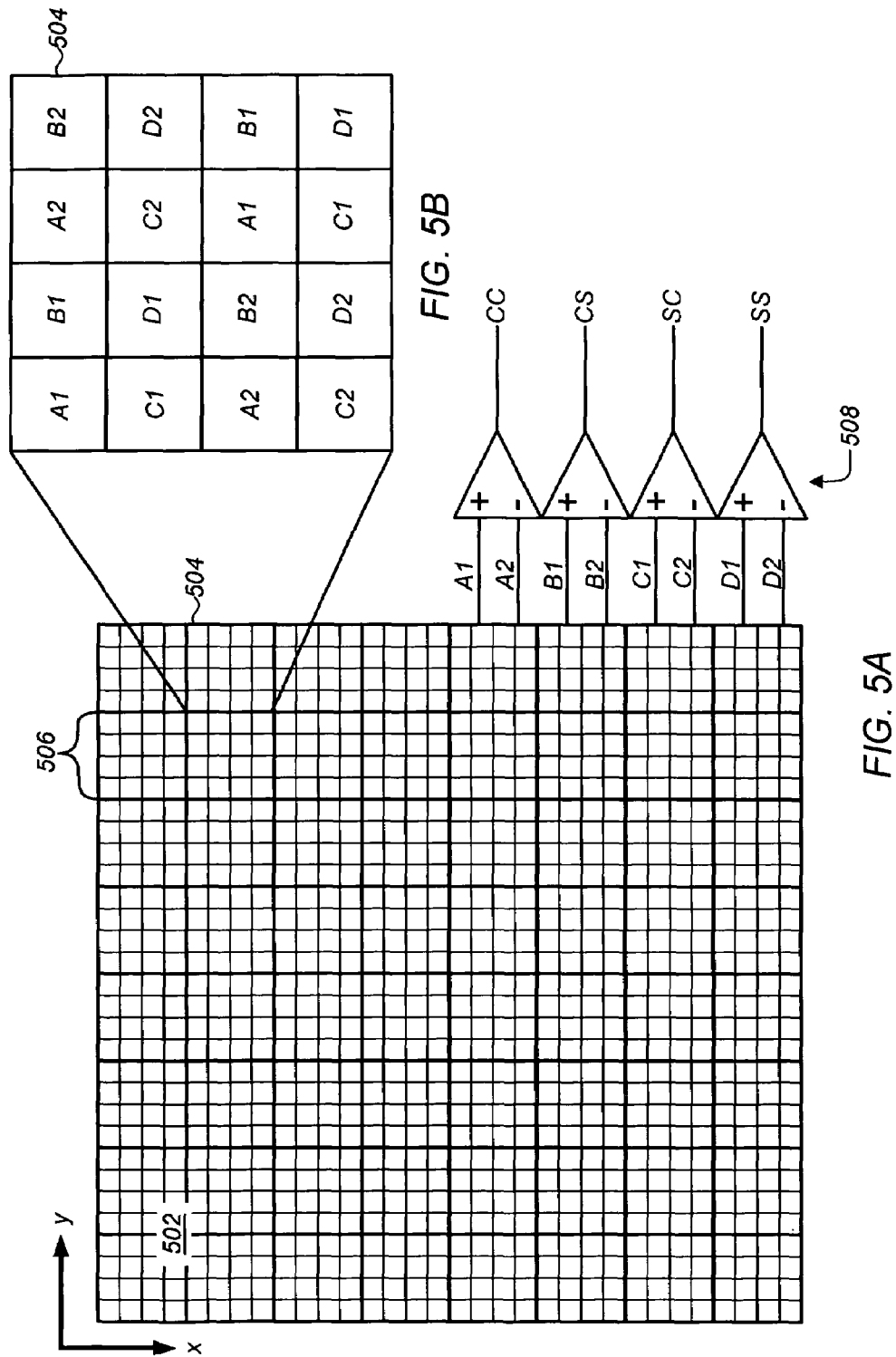
FIGS. 5A and 5B are schematic block diagrams of a 2D comb-array having photosensitive elements grouped in a 4×4 elements-per-cell configuration according to an embodiment of the present invention.
Figure 6:
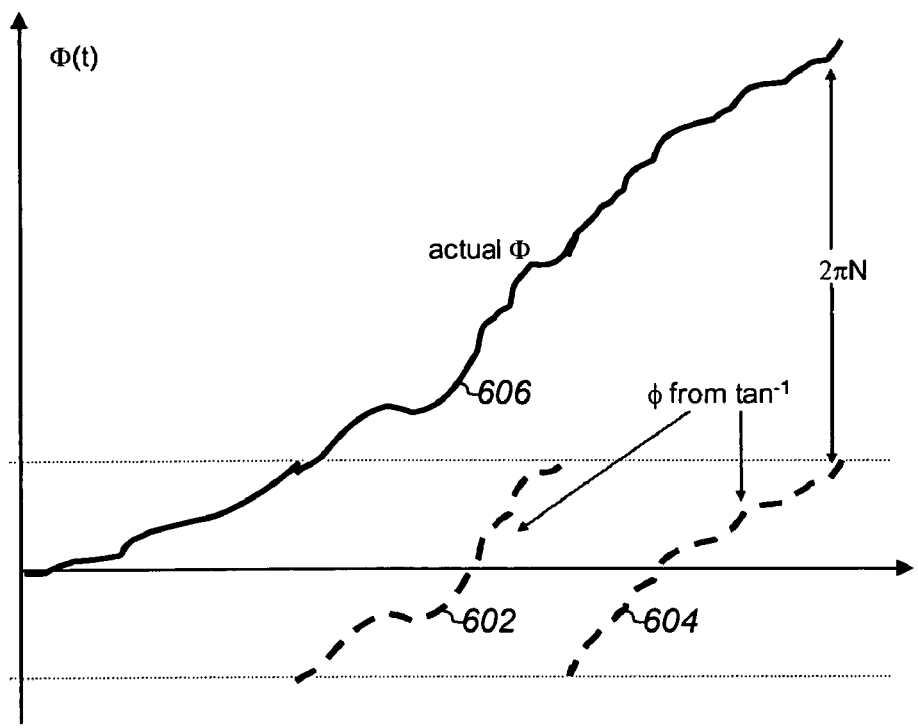
FIG. 6 is graphs of phase angle changes over time for a signal from a periodic 2D comb-array of photo-detectors.

In a preferred embodiment the optical sensor includes the detectors or photosensitive elements are arrayed in two dimensions (2D), as shown in FIGS. 5A and 5B. The performance of the 2D comb detector array is expected to be superior to the 1D×1D case since each point in the image, in the average, traverses a much longer path inside the 2D detector active area in all directions and therefore contributes more to the displacement estimation. FIGS. 5A and 5B are schematic block diagrams of a 2D comb-array having photosensitive elements grouped in a 4×4 elements-per-cell configuration. Referring to FIGS. 5A and 5B, the 2D comb-array 502 has multiple photosensitive elements 504 arranged or grouped into cells 506, each cell having photosensitive elements grouped in a 4×4 elements-per-cell (or 4×4 elements/period) configuration. Photosensitive elements 504 within a cell 506 with the same letter and same number, as shown in the detail of FIG. 5B, as well as corresponding elements of all cells in the 2D comb-array 502 with the same number, are electrically connected or wired-sum to yield eight signals A1 through D2. The eight wired-sum signals are further combined with differential amplifiers 508 to provide four signals containing the in-phase and quadrature information in the x and y directions.

Although the detector or photosensitive elements shown in FIGS. 5A and 5B are equal in size and square, it will be understood that is a particular embodiment of a 2D array which is not necessary to practice the invention.

Signal Processing

A signal processing method according to the present invention will now be described in detail with reference to FIGS. 5A, 5B, 6 and 7.

The image captured on the 2D comb detector array of FIGS. 5A and 5B is (de)-magnified such that the spatial frequency distribution of the image is roughly centered around the spatial frequency of the detector array. Through the processing of the four quasi-sinusoidal outputs (CC, CS, SC, and SS) representing separate in-phase and quadrature signals for motion along two orthogonal axes, it is possible to track the 2D movement of the image as it moves across the detector array and derive the motion of the surface relative to the detector array along the two orthogonal axes.

$$\phi_x = \tan^{-1}\left(\frac{Q}{I}\right) = \tan^{-1}\left(\frac{CS+SC}{CC-SS}\right) \quad (2.0)$$

where $\phi_x$ is the phase angle value in the x direction, and CC, CS, SC, and SS are the four quasi-sinusoidal output signals from the array shown in FIG. 5A and described above.

For a 2D motion, the phase angle value in a y direction, $\phi_y$, can be computed similarly using equation 3.0 shown below.

$$\phi_y = \tan^{-1}\left(\frac{CS - SC}{CC + SS}\right) \quad (3.0)$$

The velocity of the movement of the sensor relative to the surface can now be determined by tracking the phase angle changes over time, that is from frame to frame using the following equation:

$$\text{Velocity} = \left(\frac{\Delta\phi}{\Delta t}\right) \quad (4.0)$$

The phase angle changes $\Delta\phi_x$ and $\Delta\phi_y$ represent the movement of an image across the detector in 2D. For the 2D comb array shown in FIGS. 5A and 5B, the phase angle changes $\Delta\phi_x$ and $\Delta\phi_y$ from the previous sample frame are proportional to the detected 2D displacements along the two orthogonal axes between the current and previous sample frames. Note also, because $\Delta t$ or the sampling rate is constant velocity is proportional to $\Delta\phi$. Accordingly, the terms velocity and $\Delta\phi$ are used interchangeably throughout the remainder of this description.

Optionally, at each sample frame radius values $R_x$ and $R_y$ are computed as well as phase angle values $\phi_x$ and $\phi_y$ using the following equations:

$$R_x = \sqrt{(CC-SS)^2 + (CS+SC)^2} \quad (5.0)$$

$$R_y = \sqrt{(CC+SS)^2 + (CS-SC)^2} \quad (6.0)$$

$R_x$ and $R_y$ indicate the contrast of the detected quasi-sinusoidal signals, and can be used as weighting factors in average velocity calculations and/or as an indication of quality of the received signal.

Due to the mathematical nature of the inverse tangent function (i.e., $\tan(\phi)=\tan(\phi+2\pi N)$), where N is a whole number greater than or equal to 1, the computed phase angles $\phi_x$ and $\phi_y$ are always wrapped within the range of $[-\pi, +\pi]$. Thus, to compute the correct 2D displacements between two successive frames, the phase angle changes $\Delta\phi_x$ and $\Delta\phi_y$ need to be unwrapped to account for any additional full $2\pi$ rotations that may have occurred between the two sample frames (see graphs 602, 604 and 606 of FIG. 6). The dotted curves of graphs 602 and 604 represent the wrapped phase angle value over time computed from the inverse tangent function, and the solid curve of graph 606 represents the unwrapped phase angle value over time. In particular, the solid curve of graph 606 shows the unwrapped or actual phase angle value representing the movement of an image across the detector in one of a pair of 2D axes over time. As graphically shown in FIG. 6, unwrapping involves shifting the wrapped phase angle value from the inverse tangent function by $2\pi N$, where N is a whole number of one or more.

It will be appreciated that additional information is needed to unwrap these phase angle values. One possible approach to unwrapping the phase angles is to reference the phase angle values from the previous sample frame, and assuming that the phase angle changes between two successive frames are always within the range of $[-\pi, +\pi]$. This approach, however, will limit the maximum detectable speed of the motion to the Nyquist limit (i.e., the highest frequency signal that can be detected at a given sampling rate). For example, for a 2D comb detector array having a period or M value of 4, a 20 μm detector pitch, 2× magnification and operating at a 10 kHz sampling rate, the maximum detectable speed is given by the following equation:

$$V_{max} = \frac{M \times \text{Pitch}}{2 \times \text{Magnification} \times \Delta t} \quad (7.0)$$

where Pitch is the detector cell pitch and $(1/\Delta t)$ is the sampling rate. Thus, for the detector described above $V_{max}$ using this approach is 20 cm/second. This approach has some severe limitations that lead to significant error under normal operating conditions of an optical navigation system, such as an optical mouse.

Phase Unwrapping Using Velocity Predictor

A signal processing method according to the present invention that will unwrap phase angle values calculated from the inverse tangent function, more accurately without imposing limitations on maximum detectable speed of motion, will now be described. For development of the method in the following description it is assumed the ith frame currently being sampled, and $\Delta\phi_{x,i}$ and $\Delta\phi_{y,i}$ represent the phase angle changes (wrapped) between the current and previous frames, calculated from the inverse tangent function. Thus:

$$\Delta\phi_{x,i} = \phi_{x,i} - \phi_{x,i-1} \text{ where } \phi_{x,i} = \tan^{-1}\left(\frac{CS_i + SC_i}{CC_i - SS_i}\right) \quad (8.0)$$

$$\Delta\phi_{y,i} = \phi_{y,i} - \phi_{y,i-1} \text{ where } \phi_{y,i} = \tan^{-1}\left(\frac{CS_i - SC_i}{CC_i + SS_i}\right) \quad (9.0)$$

Letting $\Delta\Phi_{x,i}$ and $\Delta\Phi_{y,i}$ be the corrected (unwrapped) phase angle changes between the current and previous frames, the average phase changes along the X and Y axes between two successive frames (i.e., the average velocities), $\langle\Delta\Phi_x\rangle_i$ and $\langle\Delta\Phi_y\rangle_i$ can be computed using the $\Delta\Phi_{x,(i-j)}$ and $\Delta\Phi_{y,(i-j)}$ values from the past K frames.

$$\langle\Delta\Phi_x\rangle_i = \frac{1}{K}\sum_{j=1}^{K} \Delta\Phi_{x,(i-j)} \quad (10.0)$$

$$\langle\Delta\Phi_y\rangle_i = \frac{1}{K}\sum_{j=1}^{K} \Delta\Phi_{y,(i-j)} \quad (11.0)$$

The average velocity values computed from the above equations are referred to hereinafter as "Velocity Predictors." These velocity predictors can be used to unwrap phase angle values, and changes in phase angles calculated from the inverse tangent function. The method or process begins with calculating the number of full $2\pi$ rotations needed to unwrap the phase angles assuming that the phase angle changes between the current and previous frames would be within the range of $[(\langle\Delta\Phi_x\rangle_i-\pi), (\langle\Delta\Phi_x\rangle_i+\pi)]$ or $[(\langle\Delta\Phi_y\rangle_i-\pi), (\langle\Delta\Phi_y\rangle_i+\pi)]$. The number (N) of full $2\pi$ rotations is calculated using the following equations:

$$N_{x,i} = \text{INTEGER}\left(\frac{\Delta\phi_{x,i} - \langle\Delta\Phi_x\rangle_i + \pi}{2\pi}\right) \quad (12.0)$$

$$N_{y,i} = \text{INTEGER}\left(\frac{\Delta\phi_{y,i} - \langle\Delta\Phi_y\rangle_i + \pi}{2\pi}\right) \quad (13.0)$$

where $\Delta\phi_{x,i}$ and $\Delta\phi_{y,i}$ are the uncorrected or wrapped phase angle changes, $\langle\Delta\Phi_x\rangle_i$ and $\langle\Delta\Phi_y\rangle_i$ are the velocity predictors, and the INTEGER function returns the largest integer value that is not greater than the function's argument. The unwrapped or corrected phase angle changes can then be computed as follows:

$$\Delta\Phi_{x,i} = \Delta\phi_{x,i} - 2\pi \times N_{x,i} \quad (14.0)$$

$$\Delta\Phi_{y,i} = \Delta\phi_{y,i} - 2\pi \times N_{y,i} \quad (15.0)$$

It will be appreciated that this method of unwrapping phase angle values for detecting motion does not impose limitations on maximum detectable speed of motion, but it does impose limitations on maximum detectable acceleration (or deceleration). For example, using a 2D comb detector array having the values or characteristics given above in connection with equation 7.0, i.e., a period or M value of 4, a 20 μm detector pitch, 2× magnification and operating at a 10 kHz sampling rate, the maximum detectable acceleration ($A_{max}$) can be calculated from the following equation:

$$A_{max} = \frac{M \times \text{Pitch}}{2 \times \text{Magnification} \times \Delta t^2} \quad (16.0)$$

where Pitch is the detector cell pitch and $(1/\Delta t)$ is the sampling rate. Thus, for the detector described above the $A_{max}$ is about 2000 m/s$^2$ or 200* G. When the acceleration exceeds $A_{max}$, for any difference in the predicted velocity and the true velocity that is greater than $\pi$, the predictor can no longer discriminate between acceleration and deceleration. However, the typical motion that is detectable by most optical navigation systems, such as optical mice, is not likely to exceed such a large, 200* G, acceleration or deceleration.

Figure 7:
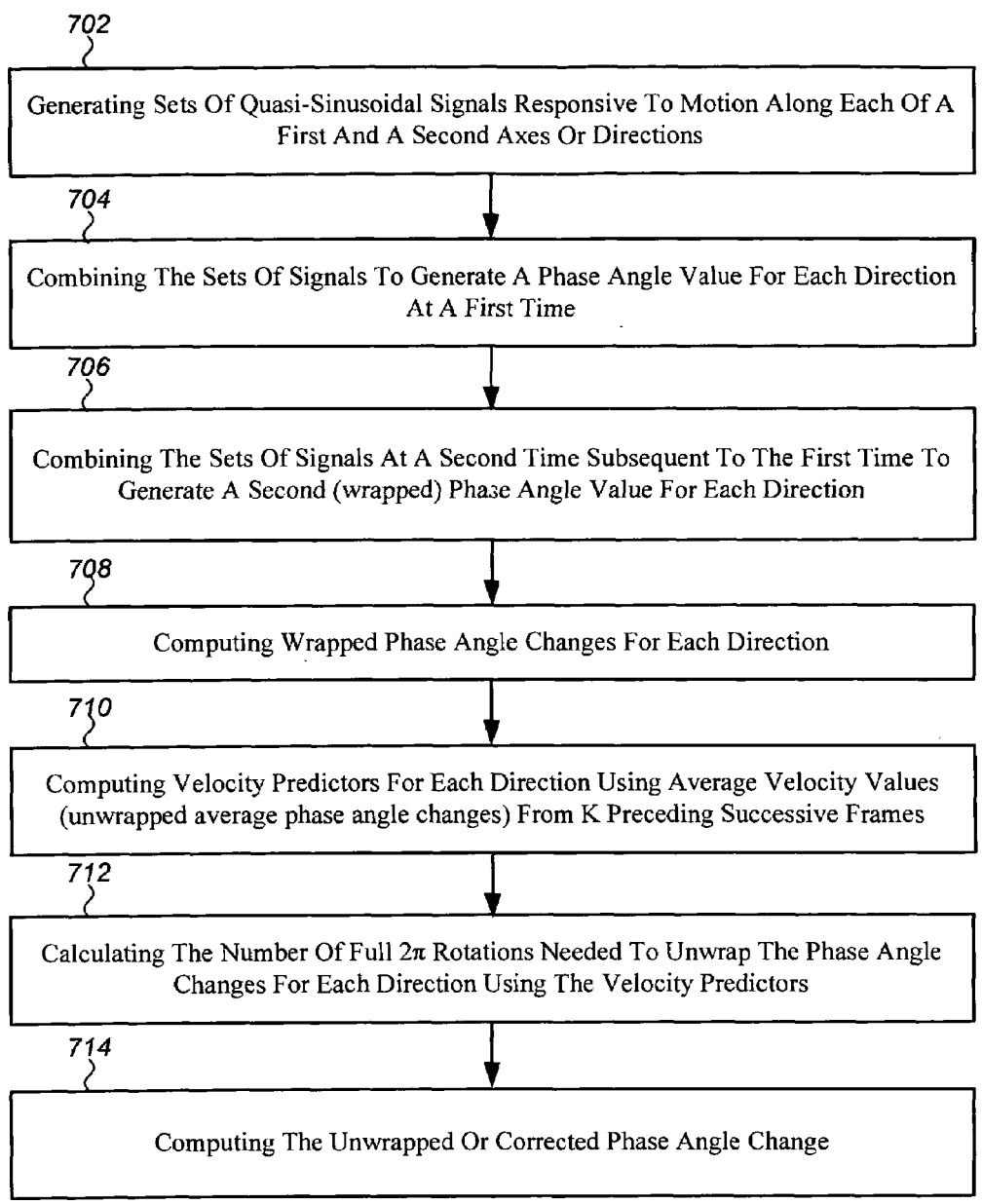
FIG. 7 is a flowchart of a signal processing method according to an embodiment of the present invention.

A flowchart of a method for detecting motion of an optical sensor relative to a surface, including a step of unwrapping phase angle values according to an embodiment of the present invention, is shown FIG. 7. Briefly, the method involves: (i) generating sets of quasi-sinusoidal signals (CC, CS, SC, and SS) responsive to motion along each of a first and a second axes or direction (702); (ii) combining the sets of signals to generate a phase angle value for each direction at a first time (704); (iii) combining the sets of signals at a second time (frame) subsequent to the first time (frame) to generate a second phase angle value for each direction (706); (iv) computing wrapped phase angle changes ($\Delta\phi_x$ and $\Delta\phi_y$) for each direction between the first time and the second time (708); (v) computing velocity predictors for each direction using average velocity values (unwrapped average phase angle changes) from K preceding successive frames (710); calculating the number of full $2\pi$ rotations needed to unwrap the phase angle changes for each direction using the velocity predictors (712); and computing the unwrapped or corrected phase angle changes (714). They are then combined to determine the movement of an image across the detector in two dimensions or directions over time.

Improvements on Velocity Predictor Estimation

It will be appreciated that selection of the number of frames to average over (i.e., the K value) is critical in obtaining an accurate estimation of the velocity predictors. A larger K value will yield a better estimation at slow speed of motion where the noise in the phase measurement is significant, while a smaller K value may estimate velocity more accurately with very fast motion or in the presence of higher accelerations. Thus, it is important to choose a K value that can cover a wide range of speeds fairly accurately. It has been found that setting the K value around 64 frames provides a reasonably good prediction on speed of the motion over a wide range of velocities from about 0.1 inch/second to over 20 inch/second.

In another embodiment, the sampling rate can be dynamically adjusted or adapted based on an estimated or past speed of the motion to further improve this velocity predictor estimation. That is, the sampling rate can be reduced (i.e., increase $\Delta t$) when the estimated motion is slow and the sampling rate can be increased (i.e., decrease $\Delta t$) when the detected motion speeds up.

In yet another embodiment, the velocity predictor estimation is improved by computing the radius-weighted average velocities from the past K frames, since the radius values, $R_{x,i}$ and $R_{y,i}$, are very good indicators of the detected signal contrast and hence the quality of the associated phase measurement. In this embodiment, the velocity predictor values may be calculated as follows:

$$\langle\Delta\Phi_x\rangle_i = \frac{\sum_{j=1}^{K} R_{x,(i-j)} \times \Delta\Phi_{x,(i-j)}}{\sum_{j=1}^{K} R_{x,(i-j)}} \quad (17.0)$$

$$\langle\Delta\Phi_y\rangle_i = \frac{\sum_{j=1}^{K} R_{y,(i-j)} \times \Delta\Phi_{y,(i-j)}}{\sum_{j=1}^{K} R_{y,(i-j)}} \quad (18.0)$$

where $R_{x,i}$ and $R_{y,i}$ are computed using equations 5.0 and 6.0 given above.

In summary, the advantages of the signal averaging circuit and method of the present invention over previous or conventional circuits and methods include improved accuracy of a phase angle unwrapping algorithm employed in quasi-sinusoidal signal processing, and hence the performance of the motion tracking by a comb-detector array without imposing additional limitations on the detectable speed of the motion. The method also enables fairly accurate detection of very high-speed motion (i.e., greater than 20 inch/second) with limited data sampling rate (i.e., less than 40 kHz). This last advantage is particularly desirable in applications, such as wireless optical mice, where the sampling rate is limited due to certain power consumption budget.

The advantages of the signal averaging circuit and method of the present invention over previous or conventional circuits and methods will now be described in detail with reference to FIGS. 8 through 11.

Results of Prototype Testing

Figure 8:
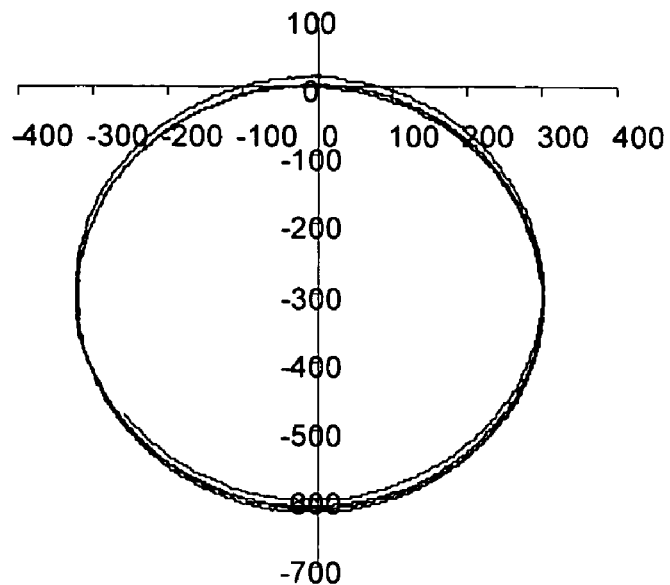
FIG. 8 is a graph of circular trajectories at a low speed of 1 cm/s for an optical navigation system over a surface detected by a signal processing method using a velocity predictor to unwrap phase angle values according to an embodiment of the present invention.
Figure 9:
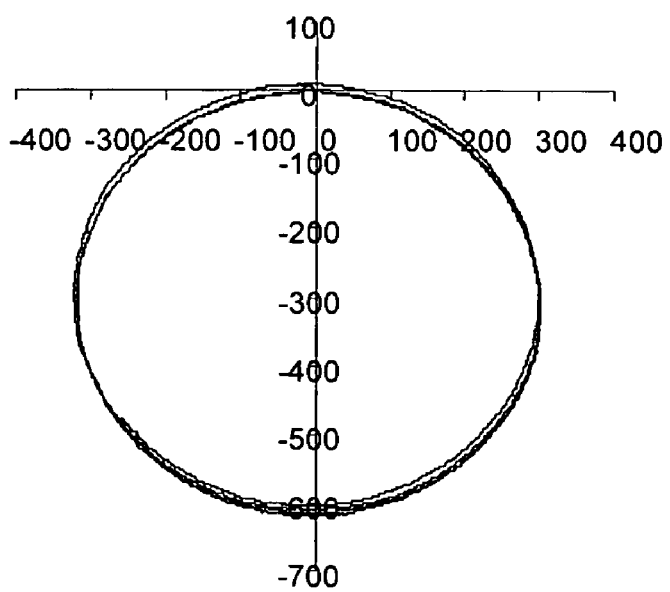
FIG. 9 (prior art) is a graph of circular trajectories at a low speed for an optical navigation system over a surface detected by a signal processing method using past phase angle values to predict current phase angle values according to a conventional signal processing method.

FIGS. 8 and 9 show traces of 1 cm/s circular motion of 1 cm radius detected using a 2D comb detector array similar to that described above with reference to FIGS. 5A and 5B.

In particular, FIG. 8 shows motion detection using velocity predictor to uncover the missing phase angle rotations at the signal processing stage according to an embodiment of the present invention. FIG. 9 shows motion detection using past phase angle values to uncover the missing phase angle rotations. Referring to FIGS. 8 and 9 it is seen that when the speed of the motion is at 1 cm/s, the phase angle changes between frames are very small (i.e., much less than π or a 180 degree phase angle rotation) with a 10 kHz-sampling rate, determination of motion using the velocity predictor (shown in FIG. 8) is substantially the same as that using past phase angle values to predict the missing phase angle rotations (shown in FIG. 9).

Figure 10:
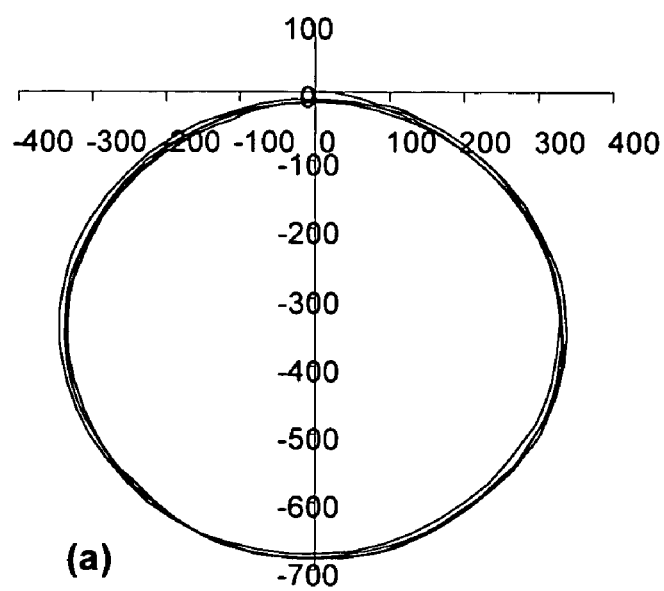
FIG. 10 is a graph of circular trajectories for an optical navigation system moved at 25 cm/s over a surface detected by a signal processing method using a velocity predictor to unwrap the phase angle values according to an embodiment of the present invention.
Figure 11:
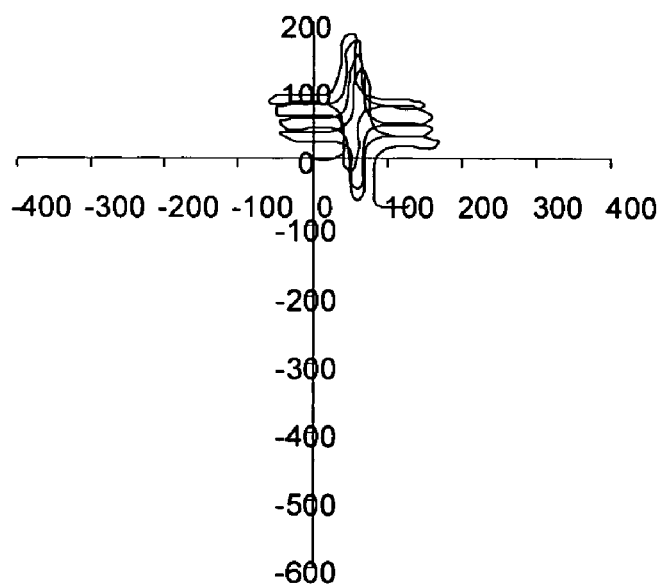
FIG. 11 (prior art) is a graph of circular trajectories for an optical navigation system moved at 25 cm/s over a surface detected by a signal processing method using past phase angle values to predict current phase angle values according to a conventional signal processing method (without using a velocity predictor).

FIGS. 10 and 11 show traces of 25 cm/s circular motion of 1 cm radius using a 2D comb detector array with and without the use of velocity predictors respectively. In particular, FIG. 10 shows detection of 25 cm/s motion using the velocity predictor according to an embodiment of the present invention. FIG. 11 shows a motion detection attempt using past phase angle values to predict the missing phase angle rotations. From these figures it is seen that when the speed of the motion increases to 25 cm/s or beyond, the phase angle changes between frames are large (180 to 360 degrees or more), and with a 10 kHz-sampling rate it is not possible to detect or estimate the motion correctly without the use of the velocity predictor of the present invention.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method for detecting movement of a surface relative to an optical sensor having an array of photosensitive elements, the method comprising steps of:
    generating at least one set of quasi-sinusoidal signals responsive to motion of light received on the array in at least a first direction;
    combining said at least one set of quasi-sinusoidal signals to generate a phase angle value for said first direction at a first time;
    combining said at least one set of quasi-sinusoidal signals at a second time to generate a phase angle value for said first direction at the second time;
    computing wrapped phase angle changes for said first direction;
    computing the unwrapped phase angle changes for said first direction; and
    determining a value of distance moved in the first direction; and
    wherein the step of computing the unwrapped phase angle changes for said first direction comprises the step of computing velocity predictors for said first direction using average velocity values from a number, K, of preceding successive frames, where K is a whole number greater than or equal to two.

2. A method according to claim 1, wherein the step of computing velocity predictors for the said first direction using average velocity values comprises the step of computing average phase angle changes along the said first direction using K sets of unwrapped phase angle changes from the preceding successive K frames.

3. A method according to claim 1, wherein the step of computing wrapped phase angle changes comprises the step of computing changes in phase angles between two successive sample frames, calculated from an inverse tangent function using at least one set of quasi-sinusoidal signals responsive to motion.

4. A method according to claim 1, wherein the step of generating at least one set of quasi-sinusoidal signals comprises the step of generating at least two sets of quasi-sinusoidal signals, the first set related to motion in the first direction and a second set related to motion in a second direction.

5. A method according to claim 4, wherein the step of determining a value of distance moved comprises the step of determining a value of distance moved in two-dimensions.

6. A method according to claim 1, further comprising the step of computing radius values in addition to phase angle values at each sample frame as an indication of the quality of the at least two sets of quasi-sinusoidal signals related to motion in the first direction and in the second direction.

7. A method according to claim 6, wherein the computed radius values are used as weighting factors in computing velocity predictors for the first direction and the second direction using unwrapped average phase angle changes from a number, K, of preceding successive frames.

8. A signal processing circuit for detecting movement of a surface relative to an optical sensor having an array of photosensitive elements, the circuit comprising:
    means for generating at least one set of quasi-sinusoidal signals responsive to motion of light received on the array in at least a first direction;
    means for combining said at least one set of quasi-sinusoidal signals to generate a phase angle value for said first direction at a first time, and combining said at least one set of quasi-sinusoidal signals at a second time to generate a phase angle value for said first direction at the second time;
    means for computing wrapped phase angle changes for said first direction from the phase angle values generated at said first and second times;
    means for computing the unwrapped phase angle changes for said first direction;
    means for determining a value of distance moved in the first direction; and
    wherein the means for computing the unwrapped phase angle changes comprises means for computing velocity predictors for said first direction using average velocity values from a number, K, of preceding successive frames, where K is a whole number greater than or equal to two.

9. A circuit according to claim 8, wherein the means for computing velocity predictors for the said first direction using average velocity values comprises means for computing average phase angle changes along the said first direction using K sets of phase angle changes from the preceding successive K frames.

10. A circuit according to claim 8, wherein the means for computing wrapped phase angle changes comprises means for computing changes in phase angles between two successive sample frames, calculated from an inverse tangent function using at least one set of quasi-sinusoidal signals responsive to motion.

11. A signal processing circuit for detecting movement of a surface relative to an optical sensor having an array of photosensitive elements, the circuit comprising:

means for generating at least one set of quasi-sinusoidal signals responsive to motion of light received on the array in at least a first direction;

means for combining said at least one set of quasi-sinusoidal signals to generate a phase angle value for said first direction at a first time, and combining said at least one set of quasi-sinusoidal signals at a second time to generate a phase angle value for said first direction at the second time;

means for computing wrapped phase angle changes for said first direction from the phase angle values generated at said first and second times;

means for computing the unwrapped phase angle changes for said first direction;

means for determining a value of distance moved in the first direction; and wherein the means for generating at least one set of quasi-sinusoidal signals comprises means for generating at least two sets of quasi-sinusoidal signals, the first set related to motion in the first direction and a second set related to motion in a second direction.

12. A circuit according to claim 11, wherein the means for determining a value of distance moved comprises means for determining a value of distance moved in two-dimensions.

13. A method for detecting movement of a surface relative to an optical sensor having an array of photosensitive elements, the method comprising steps of:

generating at least two sets of quasi-sinusoidal signals responsive to motion of light received on the array, the first set of quasi-sinusoidal signals related to motion in a first direction and the second set of quasi-sinusoidal signals related to motion in a second direction;

at a first time combining said first set of quasi-sinusoidal signals to generate a wrapped phase angle value for said first direction at the first time, and combining said second set of quasi-sinusoidal signals to generate a wrapped phase angle value for said second direction at the first time;

at a second time combining said first set of quasi-sinusoidal signals to generate a wrapped phase angle value for said first direction at the second time, and combining said second set of quasi-sinusoidal signals to generate a wrapped phase angle value for said second direction at the second time;

computing wrapped phase angle changes between the first time and the second time for said first and second directions;

computing the unwrapped phase angle changes for said first and second directions using velocity predictors computed for said first and second directions;

determining a value of distance moved in the first and the second directions; and wherein the step of computing the unwrapped phase angle changes for said first and second directions comprises the step of computing velocity predictors for said first and second directions using average velocity values from a number, K, of preceding successive frames, where K is a whole number greater than or equal to two.

14. A method according to claim 13, wherein the step of computing velocity predictors for said first and second directions using average velocity values comprises the step of computing average phase angle changes along said first and second directions using K sets of phase angle changes from the preceding successive K frames.

15. A method according to claim 13, wherein the step of computing wrapped phase angle changes comprises the step of computing changes in phase angles between two successive sample frames, calculated from an inverse tangent function using at least two sets of quasi-sinusoidal signals responsive to motion in the said first and second directions.

16. A method according to claim 13, further comprising the step of computing radius values in addition to phase angle values at each sample frame as an indication of the quality of the at least two sets of quasi-sinusoidal signals related to motion in the first direction and in the second direction.

17. A method according to claim 16, wherein the computed radius values are used as weighting factors in computing velocity predictors for the first direction and the second direction using unwrapped average phase angle changes from a number, K, of preceding successive frames.

* * * * *